(12) United States Patent
Baek

(10) Patent No.: US 9,604,787 B1
(45) Date of Patent: Mar. 28, 2017

(54) ADJUSTABLE CONVEYOR SYSTEMS

(71) Applicant: Anders Stougaard Baek, Aarhus C (DK)

(72) Inventor: Anders Stougaard Baek, Aarhus C (DK)

(73) Assignee: CALJAN RITE-HITE APS, Hasselager (DK)

( * ) Notice: Subject to any disclaimer, the term of this patent is extended or adjusted under 35 U.S.C. 154(b) by 0 days.

(21) Appl. No.: 14/964,051

(22) Filed: Dec. 9, 2015

(51) Int. Cl.
| | |
|---|---|
| *B65G 41/00* | (2006.01) |
| *B65G 21/00* | (2006.01) |
| *B65G 21/10* | (2006.01) |
| *B65G 21/14* | (2006.01) |
| *B65G 37/00* | (2006.01) |
| *B65G 13/00* | (2006.01) |
| *B65G 15/00* | (2006.01) |

(52) U.S. Cl.
CPC .............. *B65G 21/10* (2013.01); *B65G 13/00* (2013.01); *B65G 15/00* (2013.01); *B65G 21/14* (2013.01); *B65G 37/00* (2013.01); *B65G 2207/08* (2013.01)

(58) Field of Classification Search
CPC .... B65G 41/002; B65G 41/005; B65G 21/12; B65G 21/14
USPC ................ 198/861.3, 861.4, 861.5, 588, 812
See application file for complete search history.

(56) References Cited

U.S. PATENT DOCUMENTS

| | | |
|---|---|---|
| 1,550,250 A | 8/1925 | Hackett |
| 3,651,963 A | 3/1972 | McWilliams |
| 3,717,263 A | 2/1973 | McWilliams |
| 3,819,068 A | 6/1974 | Weir |
| 3,885,682 A | 5/1975 | McWilliams |
| 3,931,897 A | 1/1976 | Bacon et al. |

(Continued)

FOREIGN PATENT DOCUMENTS

| | | |
|---|---|---|
| EP | 0904244 B1 | 6/2001 |
| EP | 1301426 A2 | 4/2003 |

(Continued)

*Primary Examiner* — James R Bidwell
(74) *Attorney, Agent, or Firm* — Hanley, Flight & Zimmerman, LLC

(57) ABSTRACT

Example adjustable conveyor systems are disclosed herein. An example adjustable conveyor system includes a first conveyor having a first conveying surface facing upward and running lengthwise along a first longitudinal axis and a second conveyor having a second conveying surface facing upward and running lengthwise along a second longitudinal axis. The second conveyor is spaced apart from the first conveyor to define a span between the first conveyor and the second conveyor. The second conveyor is pivotal relative to the first conveyor. A first side guide protrudes upward and extends lengthwise between the first conveyor and the second conveyor proximate the span, where the first side guide has a first adjustable length. A second side guide protrudes upward and extends lengthwise between the first conveyor and the second conveyor proximate the span, where the second side guide has a second adjustable length. The first side guide is spaced apart from the second side guide to define a passageway between the first conveyor and the second conveyor. The first adjustable length automatically lengthens and the second adjustable length automatically shortens in reaction to the second conveyor pivoting relative to the first conveyor.

20 Claims, 9 Drawing Sheets

(56) References Cited

U.S. PATENT DOCUMENTS

| | | |
|---|---|---|
| 4,425,069 A | 1/1984 | Saur et al. |
| 5,178,253 A * | 1/1993 | Fix .................. E01C 23/088 198/861.6 |
| 5,462,400 A | 10/1995 | Bonnet |
| 5,538,391 A | 7/1996 | Bonnet |
| 5,697,753 A | 12/1997 | Aurora et al. |
| 6,006,893 A | 12/1999 | Gilmore et al. |
| 6,431,346 B1 | 8/2002 | Gilmore et al. |
| 6,481,563 B1 | 11/2002 | Gilmore |
| 6,484,862 B1 | 11/2002 | Gilmore et al. |
| 6,533,096 B2 | 3/2003 | Gilmore et al. |
| 6,543,622 B1 * | 4/2003 | Fridman .................. B07B 1/005 198/861.4 |
| 6,823,985 B2 | 11/2004 | Gilmore et al. |
| 6,893,200 B2 | 5/2005 | Thøgersen |
| 7,033,125 B2 | 4/2006 | Thøgersen |
| 7,077,615 B2 | 7/2006 | Thøgersen et al. |
| 7,470,099 B2 | 12/2008 | Bengtsson |
| 8,464,859 B2 | 6/2013 | Campbell et al. |
| 8,562,276 B2 | 10/2013 | Helmner |
| 8,622,199 B2 | 1/2014 | Windfeld et al. |
| 8,647,039 B2 | 2/2014 | Helmner |
| 2015/0217942 A1 * | 8/2015 | Saarinen ................ B65G 21/14 198/313 |

FOREIGN PATENT DOCUMENTS

| | | |
|---|---|---|
| EP | 1301426 B1 | 9/2005 |
| EP | 1483150 B1 | 2/2007 |
| EP | 1667907 B1 | 12/2007 |
| EP | 1767454 B1 | 5/2013 |
| EP | 1764304 B1 | 12/2013 |
| EP | 2221248 B1 | 8/2014 |
| GB | 2200613 A | 8/1988 |

* cited by examiner

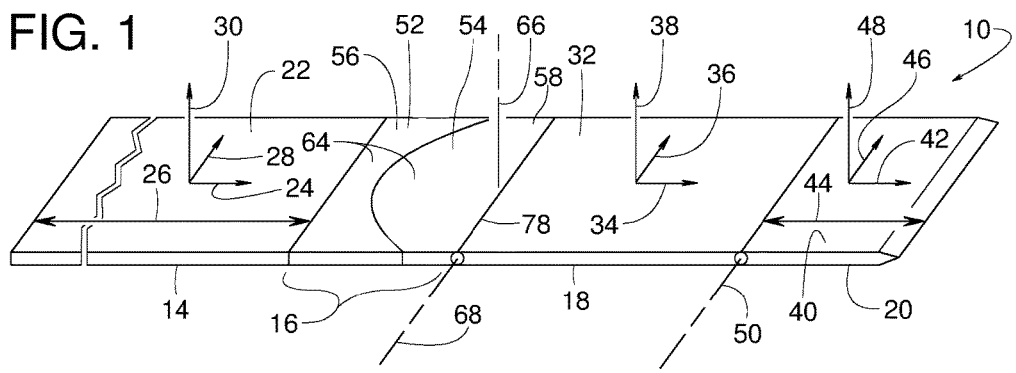
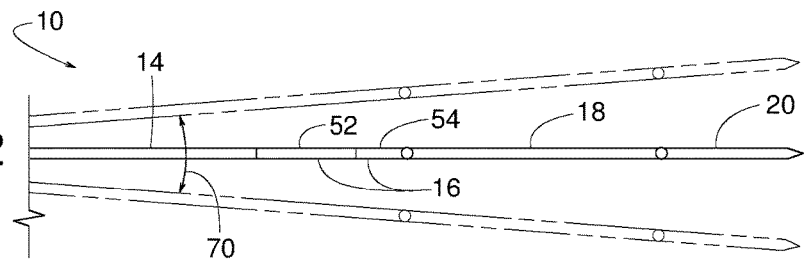
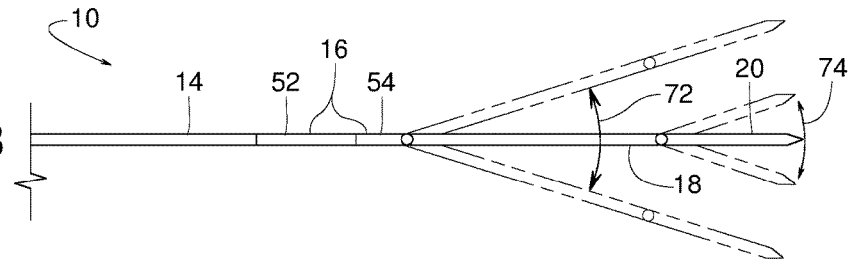
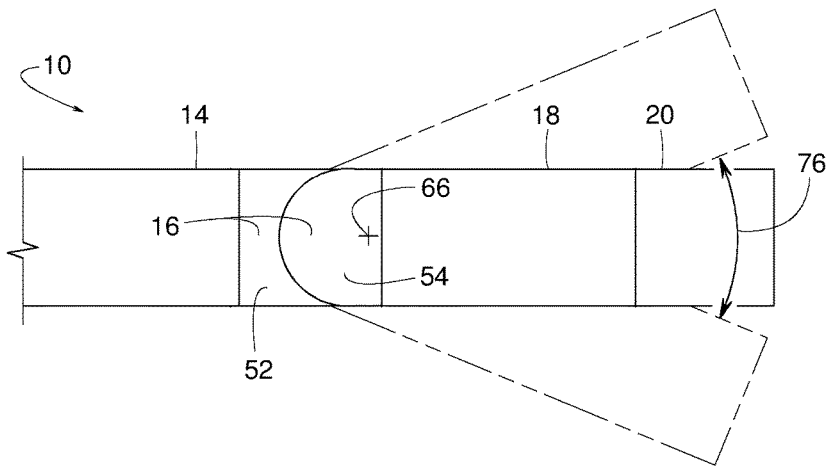

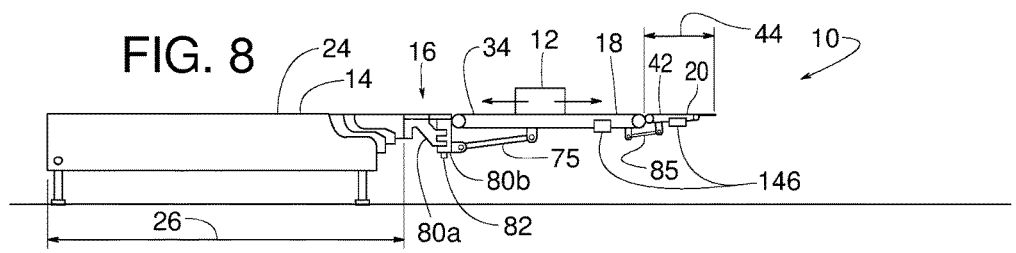
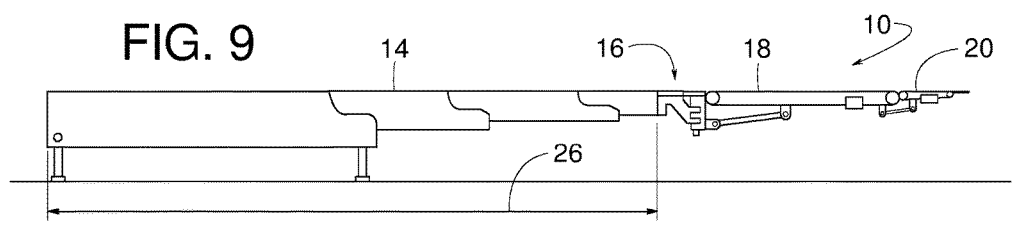
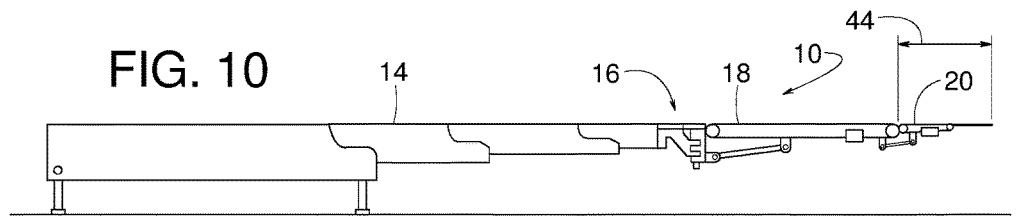
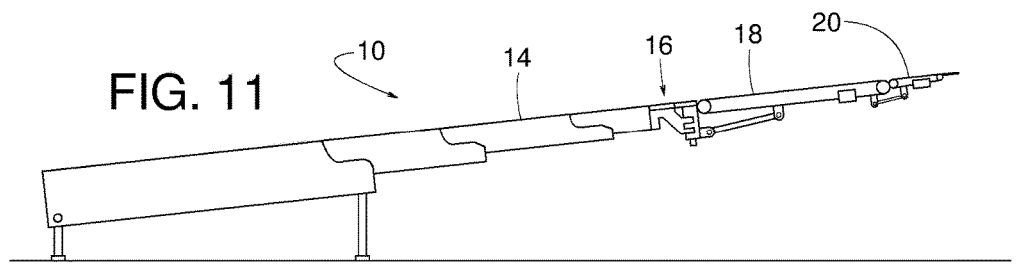
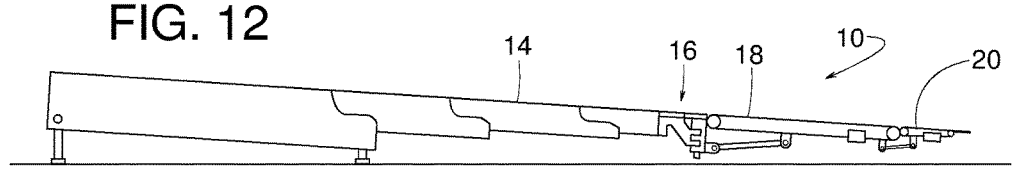

ADJUSTABLE CONVEYOR SYSTEMS

FIELD OF THE DISCLOSURE

This patent generally pertains to conveyors and, more specifically, to adjustable conveyor sections.

BACKGROUND

Conveyors typically include a plurality of rollers (e.g., cylindrical or spherical rollers) that carry and transfer items over some distance or travel path. In some examples, the travel path across an upper conveying surface of the conveyor can be horizontal or at an incline (positive or negative slope). In some examples, the conveying surface is a powered belt for moving or transferring the items over some distance. In yet other cases, the conveying surface of some conveyors have powered rollers for moving the items, but other examples, the rollers are passive, free spinning rollers, where the items being transferred move along the travel path by gravity. In some cases, a moving belt overlays the rollers to help support the items on the conveyor. Some conveyor systems include a droop snoot, which is a sloped section of the conveyor usually mounted at the end of a main conveyor. Conveyors are used in a wide variety of material handling applications for moving packages such as boxes, parcels, luggage, parts and other items.

BRIEF DESCRIPTION OF THE DRAWINGS

FIG. 1 is a schematic perspective view diagram of an example conveyor system selectively configurable in accordance with the teachings disclosed herein.

FIG. 2 is a schematic side view diagram showing some example configurations of the example conveyor system shown in FIG. 1.

FIG. 3 is another schematic side view diagram showing some example configurations of the example conveyor system shown in FIG. 1.

FIG. 4 is another schematic side view diagram showing some example configurations of the example conveyor system shown in FIG. 1.

FIG. 8 is a side view of the example conveyor system represented in FIG. 1.

FIG. 9 is a side view similar to FIG. 8 but showing the example conveyor system in a second configuration.

FIG. 10 is a side view similar to FIG. 8 but showing the example conveyor system in a third configuration.

FIG. 11 is a side view similar to FIG. 8 but showing the example conveyor system in a fourth configuration.

FIG. 12 is a side view similar to FIG. 8 but showing the example conveyor system in a fifth configuration.

DETAILED DESCRIPTION

Figure 5:
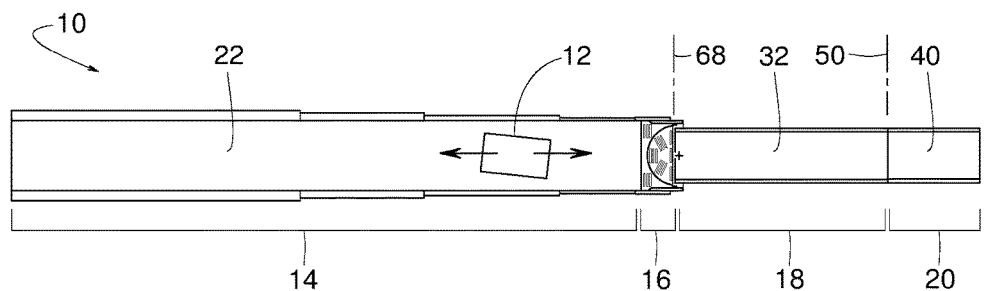
FIG. 5 is a top view of the example conveyor system represented in FIG. 1 and constructed in accordance with the teachings disclosed herein.

The example conveyor systems disclosed herein provide an articulated assembly that may include a main conveyor, a transition conveyor, a snoot conveyor and/or a distal conveyor. In some examples, an example articulated assembly may include components modeled after, or somewhat analogous to, a human arm where the main conveyor is the forearm, the transition conveyor is the wrist, the snoot conveyor is the hand, and the distal conveyor is a finger. Such an arrangement may provide a combination of relatively course and fine adjustment to quickly and/or accurately pick up or discharge conveyed packages and to smoothly convey the packages along a full length of the conveyor system at high speed in either a forward direction or a reverse direction. Some example transition conveyors include side guides that extend and/or retract automatically in reaction to part of the conveyor system turning laterally in a first direction (e.g., a right direction) and/or a second direction (e.g., a left direction).

FIGS. 1-26 show an example conveyor system 10 constructed in accordance with this disclosure. The example conveyor system 10 of the illustrated example includes various components and some optional features. In some examples, the conveyor system 10 includes a combination of powered rollers, non-powered rollers, and/or belts to convey packages 12 along the conveyor's length. The direction of roller rotation and belt travel is reversible for forward or reverse conveyance.

In the illustrated example, the conveyor system 10 is an articulated assembly including a main conveyor 14, a transition conveyor 16, a snoot conveyor 18, and a distal conveyor 20. FIGS. 1-4 schematically illustrate a geometric layout and/or freedom of movement of the conveyor system 10, which is somewhat analogous to a human arm where the main conveyor 14 is the forearm, the transition conveyor 16 is the wrist, the snoot conveyor 18 is the hand, and the distal conveyor 20 is a finger.

In this example, the main conveyor 14 has a main conveying surface 22 (e.g., a conveyor belt, rollers, etc.) facing upward and running lengthwise along a main longitudinal axis 24. In some examples, the main conveying surface 22 has an adjustable length 26. The main conveying surface 22 of the illustrated example extends widthwise and parallel to a main lateral axis 28 that is perpendicular to the main longitudinal axis 24. A main normal axis 30 lies perpendicular to both the main longitudinal axis 24 and the main lateral axis 28. The axes 24, 28 and 30 are spatial geometric terms and thus do not necessarily exist in a physical form.

The snoot conveyor 18 of the illustrated example has a snoot conveying surface 32 (e.g., conveyor belt, rollers, etc.) facing upward and running lengthwise along a snoot longitudinal axis 34. The snoot conveying surface 32 extends widthwise and parallel to a snoot lateral axis 36 that is perpendicular to the snoot longitudinal axis 34. A snoot normal axis 38 lies perpendicular to both the snoot longitudinal axis 34 and the snoot lateral axis 36. The axes 34, 36 and 38 are spatial geometric terms and thus do not necessarily exist in a physical form.

The distal conveyor 20 of the illustrated example has a distal conveying surface 40 (e.g., conveyor belt, rollers, plate, etc.) facing upward and running lengthwise along a distal longitudinal axis 42. In some examples, the distal conveyor 20 has an adjustable length 44. The distal conveying surface 40 of the illustrated example extends widthwise and parallel to a distal lateral axis 46 that is perpendicular to the distal longitudinal axis 42. A distal normal axis 48 lies perpendicular to both distal longitudinal axis 42 and the distal lateral axis 46. The distal conveyor 20 of the illustrated example is pivotal relative to the snoot conveyor 18 about a first pivotal axis 50 that is substantially parallel to the snoot lateral axis 36. Such pivotal motion is provided by examples of which include, but are not limited to, a hinge, a pin, a bearing, a shaft, a clevis joint, and/or various combinations thereof and/or any other structure to provide pivotal motion between the distal conveyor 20 and the snoot conveyor 18. The axes 42, 46, 48 and 50 are spatial geometric terms and thus do not necessarily exist in a physical form.

Referring to FIGS. 1-4, the transition conveyor 16 of the illustrated example is interposed between the main conveyor 14 and the snoot conveyor 18. The transition conveyor 16, in this example, includes a main section 52 coupled to the main conveyor 14 and a snoot section 54 coupled to the snoot conveyor 18. For spatial reference, the main section 52 of the illustrated example provides a main plane of conveyance 56, and snoot section 54 of the illustrated example provides a snoot plane of conveyance 58. In some examples, the main plane of conveyance 56 lies tangent to an upper surface of a plurality of main rollers 60 (e.g., powered or non-powered), and the snoot plane of conveyance 58 lies tangent to an upper surface of a plurality of snoot rollers 62 (e.g., powered or non-powered). In some examples one or more rollers 60 and 62 are powered by an internal roller motor. In some examples, one or more rollers 60 and 62 are interconnected by a drive belt or chain and powered by a single motor. In the illustrated example, the main plane of conveyance 56 and the snoot plane of conveyance 58 are coplanar and thus lie along a common plane of conveyance 64. It should be noted, however, that one surface being in substantially fixed coplanar alignment with another surface means that the two surfaces remain substantially flush with each other and does not mean that either surface is necessarily stationary.

While the first pivotal axis 50 enables the distal conveyor 20 to pivot vertically relative to the snoot conveyor 18, a second pivotal axis 66 of the transition conveyor 16 enables the snoot conveyor 18 to pivot sideways (e.g., about the normal axes 30, 38, 48) relative to the main conveyor 14. In some examples, the main section 52 of the transition conveyor 16 is affixed rigidly to the main conveyor 14 while a third pivotal axis 68 between the transition conveyor 16 and the snoot conveyor 18 enables the snoot conveyor 18 to pivot vertically (e.g., about the lateral axes 28, 36, 46) relative to the main conveyor 14. In other examples, the snoot section 54 of the transition conveyor 16 is affixed rigidly to the snoot conveyor 18, and the third pivotal axis 68 is between the transition conveyor 16 and the main conveyor 14, which also enables the snoot conveyor 18 to pivot vertically (e.g., relative to normal, or about the lateral axes 28, 36, 46) relative to the main conveyor 14. In some examples, the second pivotal axis 66 is substantially perpendicular to the third pivotal axis 68. It should be noted, however, that one axis (e.g., axis 66) being perpendicular to another axis (e.g., axis 68) does not necessarily mean that the two axes intersect. In some examples, the axis 66 and 68 do not intersect. For example, the axis 66 may be laterally offset relative to the axis 68 such that, although perpendicular relative to each other, the axes 66 and 68 do not intersect.

Of the conveyors 14, 18, and 20, the main conveyor 14 has the greatest length for major or course positioning adjustments; the distal conveyor 20 has the shortest length for quick, fine positioning adjustments; and the snoot conveyor 18 is of an intermediate length for moderate positioning adjustments. In the illustrated example, the length of the main conveyor 14 has the longest length, the distal conveyor 20 has the smallest length, and the snoot conveyor 18 has a length that is less than the length of the main conveyor 14 but greater than the length of the distal conveyor 20. In some examples, the distal conveyor 20 has the thinnest and narrowest profile for reaching between stacked packages 12 and for reaching up to both sides and/or floor of a trailer containing the packages 12.

The various degrees of motion of the conveyor system 10 are shown in FIGS. 2-4. Arrow 70 of FIG. 2 represents an adjustable vertical angular movement of the main conveyor 14 (e.g., about the lateral axis 28). Arrow 72 of FIG. 3 represents an adjustable vertical angular movement of the snoot conveyor 18 pivoting about the axis 68 relative to the main conveyor 14. Arrow 74 of FIG. 3 represents an adjustable vertical angular movement of the distal conveyor 20 pivoting about the axis 50 relative to the snoot conveyor 18. Arrow 76 of FIG. 4 represents an adjustable sideways angular movement of the snoot conveyor 18 pivoting about the axis 66 relative to the transition conveyor 16 and/or the main conveyor 14. Various combinations of angular adjustment plus various length adjustments of the main conveyor 14 and the distal conveyor 20 provide various conveyor system configurations for meeting different loading and/or unloading conditions. Some example configurations are shown in FIGS. 5-17.

Figure 6:
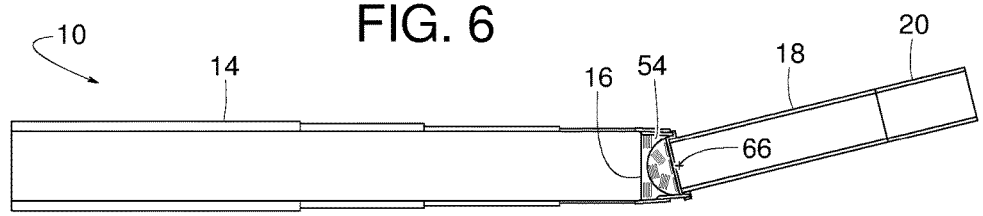
FIG. 6 is a top view similar to FIG. 5 but showing the example conveyor system in another configuration.
Figure 7:
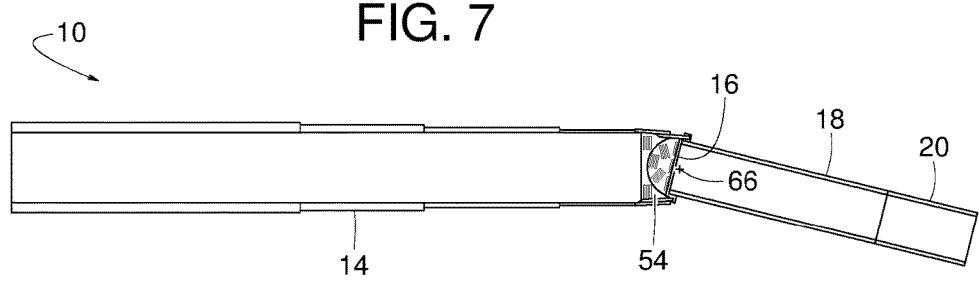
FIG. 7 is a top view similar to FIG. 5 but showing the example conveyor system in yet another configuration.

FIG. 5 is a top view showing the axes 50 and 68 being in parallel alignment with each other. FIG. 6 shows the snoot section 54 of the transition conveyor 16 having pivoted about the axis 66 to pivot the snoot conveyor 18 and the distal conveyor 20 laterally to one side of the conveyor system 10. FIG. 7 shows the snoot section 54 having pivoted about the axis 66 to pivot the snoot conveyor 18 and the distal conveyor 20 laterally to the other side of the conveyor system 10.

FIGS. 8-10 show the longitudinal axes 24, 34 and 42 being in collinear alignment with each other. FIG. 8 also shows the main conveyor 14 fully retracted, FIG. 9 shows the main conveyor 14 fully extended, FIG. 10 shows both the main conveyor 14 and the distal conveyor 20 fully extended, FIG. 11 shows the main conveyor 14 fully extended and tilted upward, and FIG. 12 shows the main conveyor 14 fully extended and tilted downward.

Figure 13:
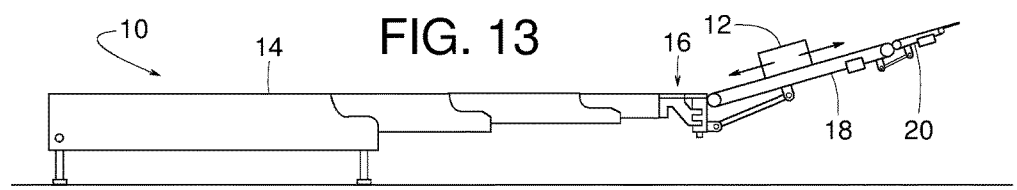
FIG. 13 is a side view similar to FIG. 8 but showing the example conveyor system in a sixth configuration.
Figure 14:
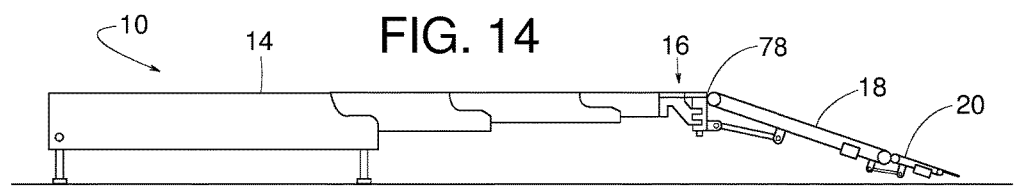
FIG. 14 is a side view similar to FIG. 8 but showing the example conveyor system in a seventh configuration.
Figure 15:
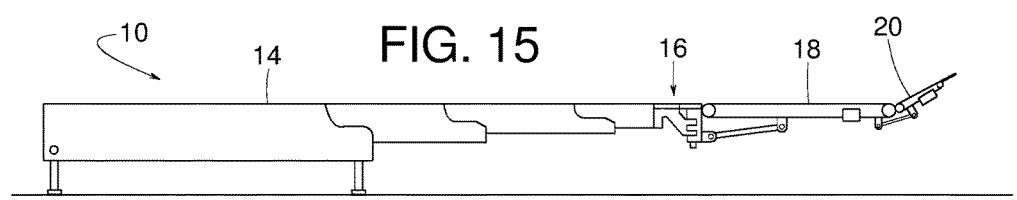
FIG. 15 is a side view similar to FIG. 8 but showing the example conveyor system in an eighth configuration.
Figure 16:
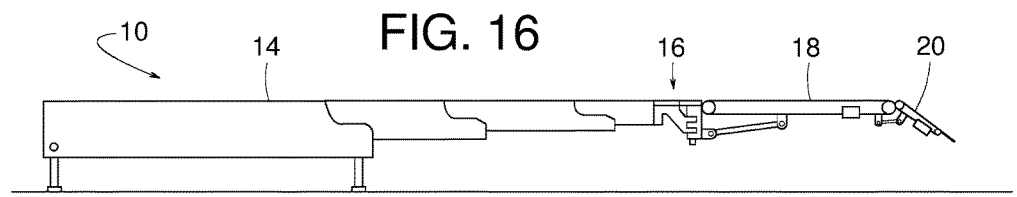
FIG. 16 is a side view similar to FIG. 8 but showing the example conveyor system in a ninth configuration.
Figure 17:
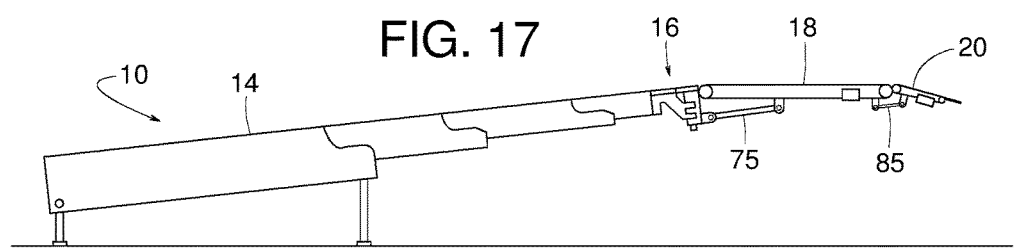
FIG. 17 is a side view similar to FIG. 8 but showing the example conveyor system in a tenth configuration.

FIG. 13 shows the main conveyor 14 level (e.g., the conveying surface 22 in a horizontal or parallel relationship relative to normal) and the snoot conveyor 18 tilted upward (e.g., the conveying surface 32 inclined) relative to the main conveyor 14. FIG. 14 shows the main conveyor 14 level and the snoot conveyor 18 tilted downward. FIG. 15 shows the main conveyor 14 and the snoot conveyor 18 level with the distal conveyor 20 tilted upward. FIG. 16 shows the main conveyor 14 and the snoot conveyor 18 level with the distal conveyor 20 tilted downward. FIG. 17 shows the main conveyor 14 tilted upward, the snoot conveyor 18 level, and the distal conveyor 20 tilted downward.

In some examples, pivotal motion 72 of the snoot conveyor 18 pivoting about the axis 68 is driven by an actuator 75 acting between the snoot conveyor 18 and the transition conveyor 16. Likewise, pivotal motion 74 of the distal conveyor 4 pivoting about the axis 50 is driven by an actuator 85 acting between the distal conveyor 20 and the snoot conveyor 18. Actuators 75 and 85 are schematically illustrated to represent any powered extendible device, examples of which include, but are not limited to, a hydraulic cylinder, a pneumatic cylinder, a linear electromechanical actuator, etc.

Although the actual structure of the transition conveyor 16 may vary, some examples of the transition conveyor 16 are provided as shown in FIGS. 18-22. In this illustrated example, the transition conveyor 16 includes the main section 52 and the snoot section 54. The main section 52 of the illustrated example is rigidly attached to the end of the main conveyor 14 such that the main plane of conveyance 56 (FIG. 1) of the transition conveyor 16 remains substantially coplanar with the main conveying surface 22 of the main conveyor 14. The main plane of conveyance 56 remains flush with the main conveying surface 22 to ensure that the packages 12 transfer smoothly (e.g., without being stuck) between the main conveyor 14 and the transition conveyor 16 regardless of a direction of travel of the packages 12. The main plane of conveyance 56 also remains substantially coplanar with the snoot plane of conveyance 58 (FIG. 1) to ensure the packages 12 pass smoothly across or along the transition conveyor 16.

In some examples, the rollers 60 and 62 are parallel to each other. In some examples, the rollers 60 and 62 are arranged in a fishbone configuration with the rollers 60 on one side being parallel to each other but arranged at an angle with respect to the rollers 62 of the opposite side. In the illustrated example, the rollers 60 and 62 are arranged in a combination of parallel and fishbone configurations. Such a combination of configurations helps to redirect the packages 12 as they travel between the main conveyor 14 and the turned snoot conveyor 18, as shown in FIGS. 6, 7, 20 and 21. Also, cylindrical rollers, each rotating about its own fixed axis, tend to be more reliable and provide less drag than, for example, ball rollers.

In the illustrated example, a pivotal joint 78 (FIGS. 1 and 14) pivotally connects the snoot section 54 to the end of the snoot conveyor 18 so that snoot conveyor 18 can pivot vertically about the axis 68. Examples of the pivotal joint 78 include, but are not limited to, a hinge, a pin, a bearing, a shaft, a clevis joint, and/or various combinations thereof.

Figure 21:
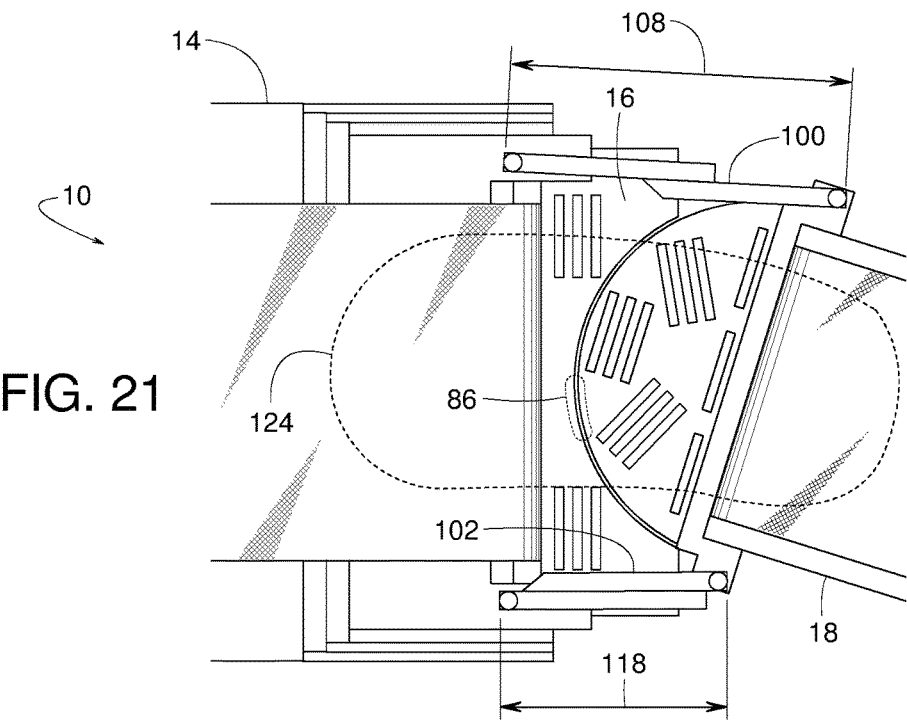
FIG. 21 is a top view similar to FIG. 19 but showing the conveyor system in the configuration of FIG. 7.
Figure 22:
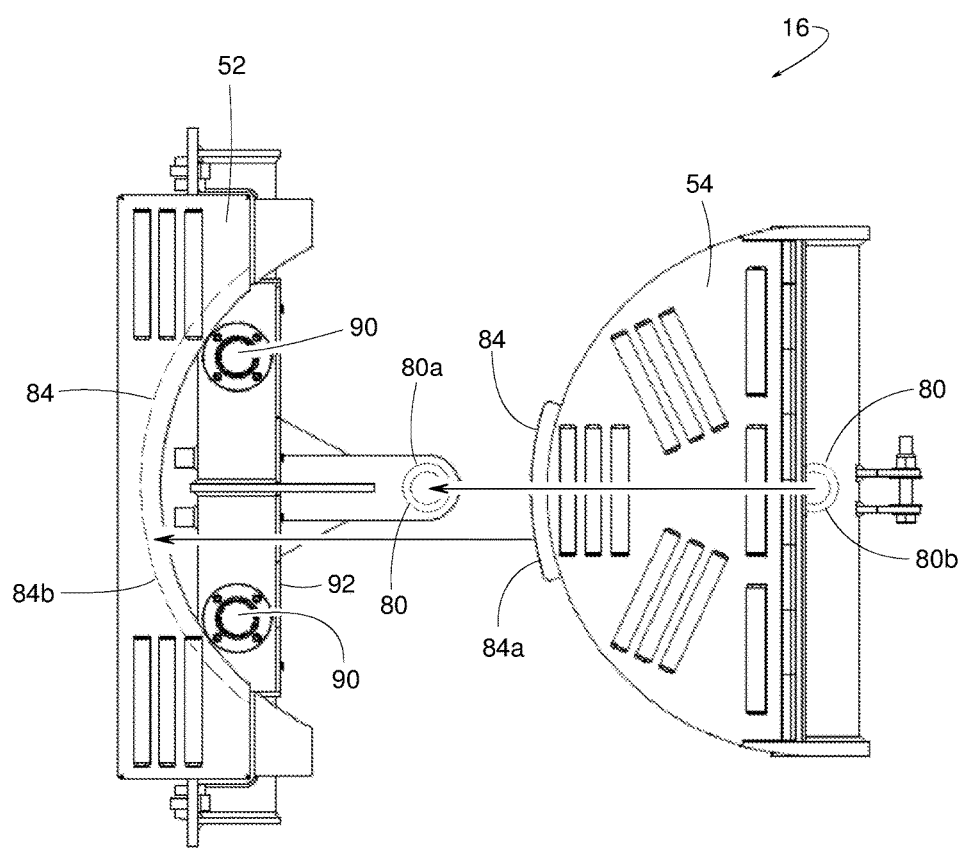
FIG. 22 is an exploded top view of an example transition conveyor constructed in accordance with the teachings disclosed herein.

To enable the snoot conveyor 18 and the snoot section 54 of the transition conveyor 16 to pivot about the axis 66 relative to the main conveyor 14 and the main section 52 of the transition conveyor 16, the transition conveyor 16 includes a pivotal joint 80 (a pin fastener 82 connecting frame members 80a and 80b) that pivotally couples the snoot section 54 to main section 52, as shown in FIGS. 8 and 22. To ensure and maintain coplanar alignment of the main section 52 and the snoot section 54, the transition conveyor 16 of the illustrated example includes a tongue-in-groove sliding bearing assembly 84 (tongue 84a and groove 84b) at a curved interface 86 (FIG. 21) between the main section 52 and the snoot section 54. As the snoot section 54 pivots sideways relative to main section 52, the pivotal joint 80 and the sliding bearing assembly 84 guide the snoot section 54 along a substantially circular path 88 (FIG. 20) in the area of curved interface 86.

In some examples, a powered actuator (e.g., an electric motor, a hydraulic motor, a fluid cylinder, etc.) drives the sideways pivotal motion of the transition conveyor 16. In other examples, the pivotal motion of the transition conveyor 16 is driven manually by pushing the distal conveyor 20 over to one side or the other. In some examples, and particularly the manually operated example, a brake 90 (e.g., a solenoid, a fluid cylinder, etc.) is mounted to a frame 92 of the main section 52. In the illustrated example, the brake 90 is selectively extendible upward to frictionally engage and grip an underside of the snoot section 54.

Figure 18:
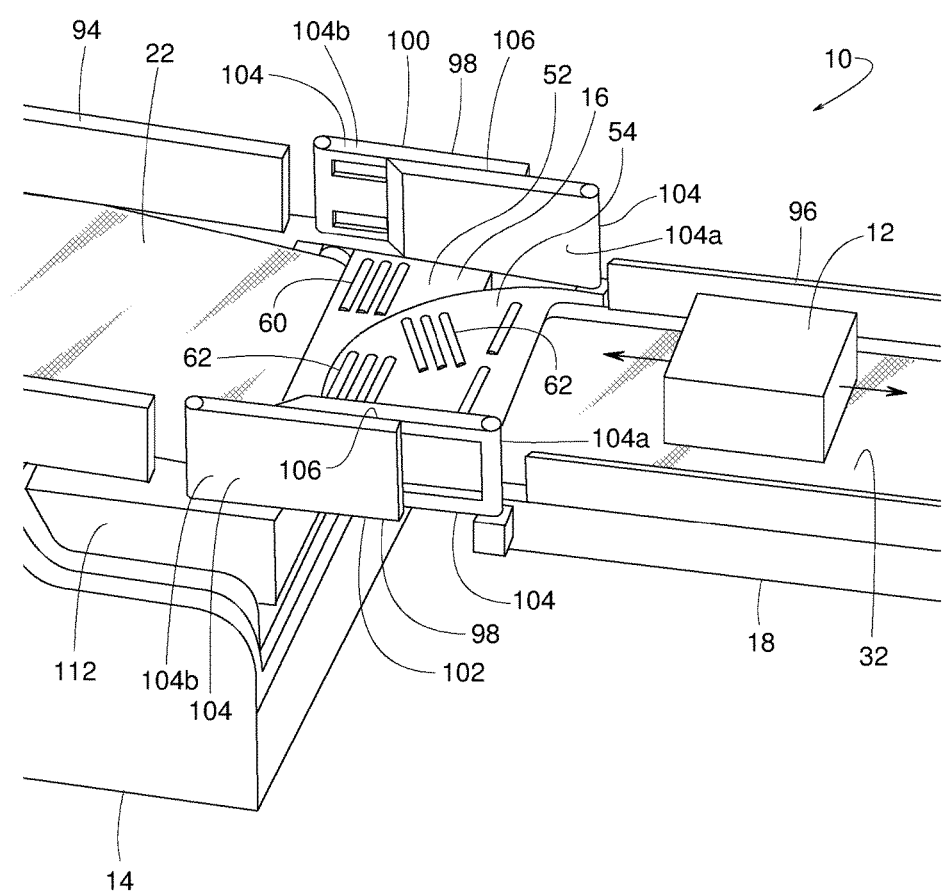
FIG. 18 is a partial, enlarged perspective view of the example conveyor system shown in FIGS. 5-17.

To prevent the packages 12 from accidentally falling off a side of the conveyor system 10, some examples of the conveyor system 10 include various side guides. FIG. 18, for example, shows a set of main side guides 94 on the main conveyor 14, a set of snoot side guides 96 on the snoot conveyor 18, and a set of transition side guides 98 proximate the transition conveyor 16. In the illustrated example, the transition side guides 98 include a first side guide 100 and a second side guide 102. Each side guide 100 and 102 includes a plurality of side guide segments 104 (e.g., an inner segment 104a and an outer segment 104b).

A sliding connection 106 offering relative translation between segments 104a and 104b provides the first side guide 100 with a first adjustable length 108 extending between a first pivotal pin connection 110 on a frame 112 of the main conveyor 14 and a second pivotal pin connection 114 on a frame 116 of the snoot conveyor 18. Likewise, the sliding connection 106 provides the second side guide 102 with a second adjustable length 118 extending between a third pivotal pin connection 120 on the frame 112 of the main conveyor 14 and a fourth pivotal pin connection 122 on the frame 116 of the snoot conveyor 18. The sliding connection 106 and the pivotal connections 110, 114, 120 and 122 enable the side guides 100 and 102 to (e.g., automatically) lengthen or shorten in reaction to the snoot conveyor 18 pivoting sideways relative to the main conveyor 14. The sliding connection 106 permitting relative sliding translation between the segments 104a and 104b while preventing the segments 104a and 104b from separating from each other can be achieved by examples of which include, but are not limited to, a sliding dovetail joint, a sliding T-slot joint, a drawer glide linear bearing, and/or a sliding interlocking key between the segments 104a and 104b.

Figure 19:
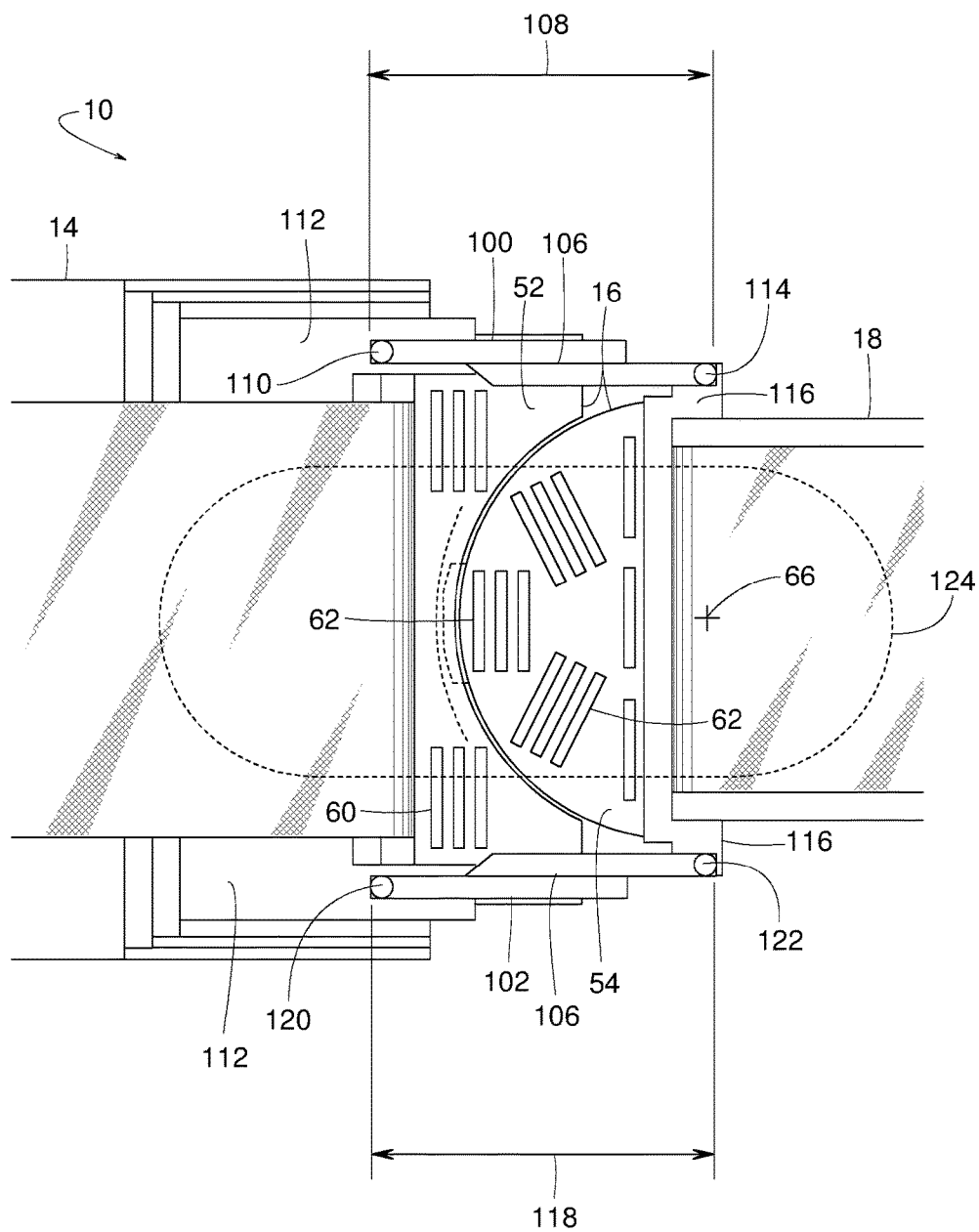
FIG. 19 is a top view of FIG. 18 but showing the conveyor system in the configuration of FIG. 5.
Figure 20:
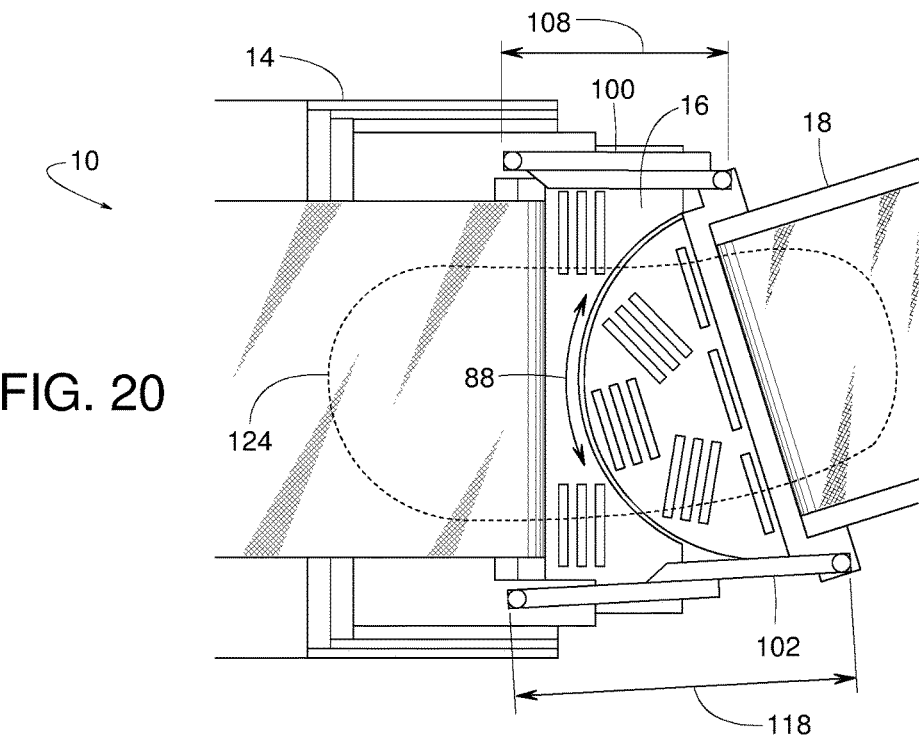
FIG. 20 is a top view similar to FIG. 19 but showing the conveyor system in the configuration of FIG. 6.

When the conveyors 14 and 18 lead straight into each other, as shown in FIG. 19, the side guides 100 and 102 are generally equal in length. However, in reaction to the snoot conveyor 18 shifting sideways to the left, as shown in FIG. 20, the first side guide 100 shortens and the second side guide 102 lengthens. Conversely, when the snoot conveyor 18 shifts sideways to the right, as shown in FIG. 21, the first side guide 100 lengthens and the second side guide 102 shortens. So, as the packages 12 travel through a passageway 124 between the main conveyor 14 and the snoot conveyor 18, the adjustable lengths 108 and 118 ensure that the packages 12 are guided laterally between the side guides 100 and 102 regardless of the angular relationship of the conveyors 14 and 18.

Figure 23:
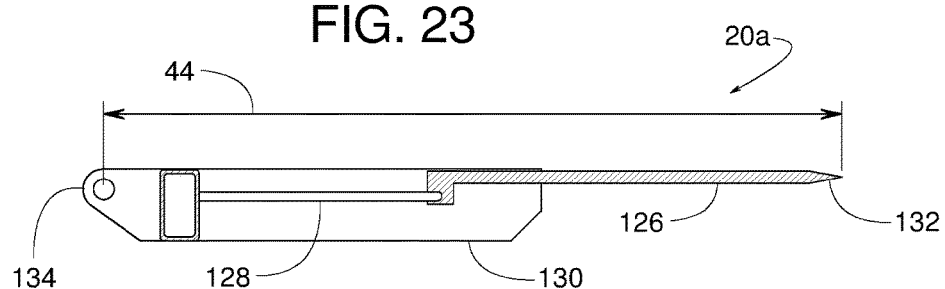
FIG. 23 is a cross-sectional side view of an example distal conveyor constructed in accordance with the teachings disclosed herein.
Figure 24:
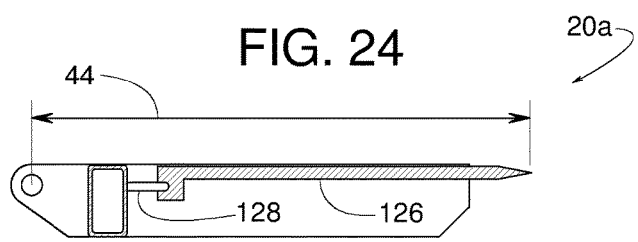
FIG. 24 is a cross-section side view similar to FIG. 23 but showing the distal conveyor retracted.

Referring to FIGS. 23-26, the structure of the distal conveyor 20 may vary. In the example shown in FIGS. 23 and 24, a distal conveyor 20a has the distal adjustable length 44 by virtue of an extension plate 126 that a powered actuator 128 (e.g., a hydraulic cylinder, a pneumatic cylinder, a linear electromechanical actuator, etc.) moves selectively in and out from within a distal conveyor housing 130. In some examples, the extension plate 126 has a beveled edge 132 for picking the packages 12 off a supporting surface, such a floor or another package underneath a package being picked. FIGS. 23 and 24 also show the housing 130 having a lug 134 to pivotally connect the distal conveyor 20a to the snoot conveyor 18 at the axis 50.

Figure 25:
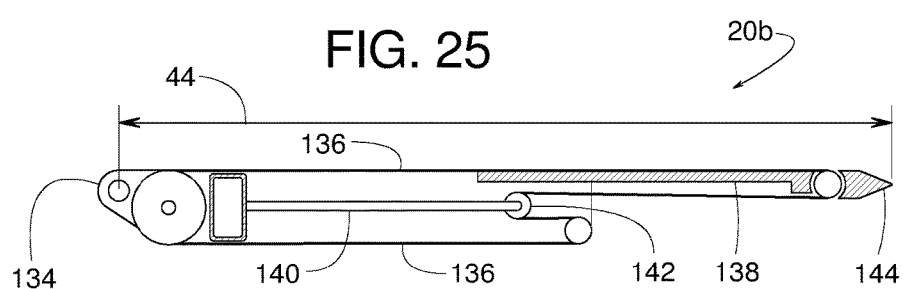
FIG. 25 is a cross-sectional side view of another example distal conveyor constructed in accordance with the teachings disclosed herein.
Figure 26:
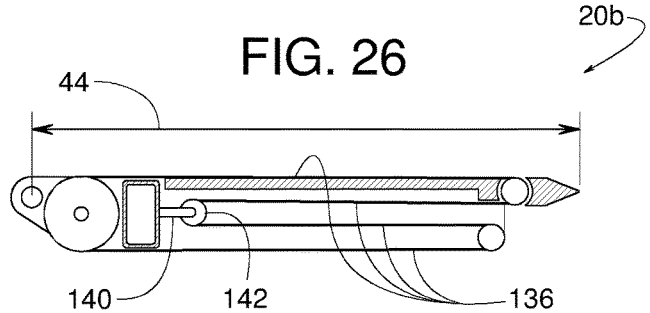
FIG. 26 is a cross-section side view similar to FIG. 25 but showing the distal conveyor retracted.

In the example shown in FIGS. 25 and 26, a distal conveyor 20b includes a powered conveyor belt 136 overlying an extendible support plate 138. In this example, a powered actuator 140 (e.g., a hydraulic cylinder, a pneumatic cylinder, a linear electromechanical actuator, etc.) moves a belt-supporting roller 142 and or the support plate 138 in and out to selectively extend and retract a beveled leading edge 144 of the plate 138. The distal conveyor 20b provides the benefits of the distal conveyor 20a plus provides the added benefit of having the powered conveyor belt 136 assist in moving the packages 12 on or off of the conveyor system 10.

Some examples of the conveyor system 10 includes one or more controllers 146 (FIG. 8) attached to the snoot conveyor 18 and/or to the distal conveyor 20. The controller 146 may be used by an operator to control various conveyor functions. Examples of conveyor functions include, but are not limited to, a belt travel speed of the main conveyor 14, a belt travel speed of the snoot conveyor 18, a belt travel speed of the distal conveyor 20, a roller speed of the rollers 60 and 62 of the transition conveyor 16, a roller direction of rotation of the rollers 60 and 62, a belt travel direction of the main conveyor 14, a belt travel direction of the snoot conveyor 18, a belt travel direction of the distal conveyor 20, a slope angle of the main conveyor 14 (relative to normal), a slope angle of the snoot conveyor 18 relative to the main conveyor 14, a slope angle of the distal conveyor 20 relative to the snoot conveyor 18, a sideways rotational angle of the snoot conveyor 18 relative to the main conveyor 14, an actuation of the brake 90, a length of the main conveyor 14, and/or a length of the distal conveyor 20. The controller 146 includes at least one user input device (e.g., a pushbutton, a lever, pad, a touchpad, a key, a proximity switch, etc.) that an operator manipulates to control the various conveyor functions. Such operator manipulation involves one or more actuators or means for actuation, examples of which include, but are not limited to, a hand actuation, an elbow actuation, a shoulder actuation, a knee actuation, feet actuation, etc.

At least some of the aforementioned examples include one or more features and/or benefits including, but not limited to, the following:

In some examples, a conveyor system includes a first section and a second section coupled to the first section to create a transition conveyor including the first section and the second section. The first section and the second section define a plane of conveyance. The transition conveyor defines a first pivotal axis that is substantially parallel to the plane of conveyance. A first conveyor runs lengthwise along a first longitudinal axis, and the first conveyor has a first conveying surface facing upward. The first conveyor relative to the transition conveyor is pivotal about the first pivotal axis. The second section relative to the first section is pivotal about a second pivotal axis that is substantially perpendicular to the first pivotal axis. A curved interface is between the first section and the second section of the transition conveyor. The second section relative to the first section is movable in a substantially circular path along the curved interface.

In some examples, a second conveyor has a second conveying surface facing upward, where the transition conveyor couples the first conveyor and the second conveyor. The first conveyor relative to the second conveyor is pivotal about the first pivotal axis.

In some examples, a second conveyor has a second conveying surface facing upward, where the transition conveyor couples the first conveyor and the second conveyor. The first conveyor relative to the second conveyor is pivotal about the first pivotal axis. The plane of conveyance is in substantially fixed coplanar alignment with the second conveying surface.

In some examples, a brake is mounted to at least one of the first section or the second section. The brake is selectively configured to selectively impede and permit relative movement between the first section and the second section at the curved interface.

In some examples, a first plurality of rollers is supported on the first section of the transition conveyor. The first plurality of rollers includes a first roller is rotatable about a first roller axis. In some examples, a second plurality of rollers is supported on the second section of the transition conveyor. The second plurality of rollers includes a second roller rotatable about a second roller axis. The first roller axis pivots relative to the second roller axis upon the first conveyor pivoting about the second pivotal axis while the first roller axis and the second roller axis remain in substantially coplanar alignment with each other.

In some examples, the first conveyor extends lengthwise along a first longitudinal axis of the first conveyor, and the conveyor system further includes a second conveyor extending lengthwise along a second longitudinal axis of the second conveyor. In some such examples, the second conveyor has a second conveying surface facing upward. In some such examples, the transition conveyor couples the first conveyor and the second conveyor. In some such examples, the first conveyor relative to the second conveyor is pivotal about the first pivotal axis. In some such examples, a first side guide extends upward and higher than the plane of conveyance of the transition conveyor. In some such examples, the first side guide has a first adjustable length extending substantially parallel to the plane of conveyance. In some such examples, a second side guide extends upward and higher than the plane of conveyance. In some such examples, the second side guide has a second adjustable length extending substantially parallel to the plane of conveyance. In some such examples, the second side guide is spaced apart from the first side guide to border a passageway extending between the first conveyor and the second conveyor. In some such examples, the transition conveyor extends underneath the passageway. In some such examples, the first adjustable length automatically lengthens and the second adjustable length automatically shortens in reaction to the second conveyor pivoting relative to the first conveyor about the second axis.

In some examples, the first side guide includes a first plurality of side guide segments. In some such examples, the second side guide includes a second plurality of side guide segments. In some such examples, the first plurality of side guide segments undergo relative translation in reaction to the second conveyor pivoting relative to the first conveyor about the second axis. In some such examples, the second plurality of side guide segments undergo relative translation in reaction to the second conveyor pivoting relative to the first conveyor about the second axis.

In some examples, the first side guide pivots relative to the first conveyor and the second conveyor in reaction to the second conveyor pivoting relative to the first conveyor about the second axis. In some such examples, the second side guide pivots relative to the first conveyor and the second conveyor in reaction to the second conveyor pivoting relative to the first conveyor about the second axis.

In some examples, a conveyor system includes a first conveyor having a first conveying surface facing upward and running lengthwise along a first longitudinal axis. In some such examples, a second conveyor has a second conveying surface facing upward and running lengthwise along a second longitudinal axis. In some such examples, the second conveyor is spaced apart from the first conveyor to define a span between the first conveyor and the second conveyor. In some such examples, the second conveyor is pivotal relative to the first conveyor. In some such examples, a first side guide protrudes upward and extending lengthwise between the first conveyor and the second conveyor proximate the span. In some such examples, the first side guide has a first adjustable length. In some such examples, a second side guide protrudes upward and extending lengthwise between the first conveyor and the second conveyor proximate the span. In some such examples, the second side guide has a second adjustable length. In some such examples, the first side guide is spaced apart from the second side guide to define a passageway between the first conveyor and the second conveyor. In some such examples, the first adjustable length automatically lengthens and the second adjustable length automatically shortens in reaction to the second conveyor pivoting relative to the first conveyor.

In some examples, the first side guide includes a first plurality of side guide segments.

In some such examples, the second side guide includes a second plurality of side guide segments.

In some such examples, the first plurality of side guide segments undergoes relative translation in reaction to the second conveyor pivoting relative to the first conveyor. In some such examples, the second plurality of side guide segments undergoes relative translation in reaction to the second conveyor pivoting relative to the first conveyor.

In some examples, the first side guide is to pivot relative to both the first conveyor and the second conveyor in reaction to the second conveyor pivoting relative to the first conveyor. In some such examples, the second side guide is to pivot relative to both the first conveyor and the second conveyor in reaction to the second conveyor pivoting relative to the first conveyor.

In some examples, a conveyor system includes a main conveyor having a main conveying surface facing upward and running lengthwise along a main longitudinal axis. In some such examples, the main conveying surface extends widthwise and parallel relative to a main lateral axis that is perpendicular to the main longitudinal axis. In some such examples, the main longitudinal axis and the main lateral axis defining a main normal axis that is perpendicular relative to the main longitudinal axis and the main lateral axis. In some such examples, a snoot conveyor has a snoot conveying surface facing upward and running lengthwise along a snoot longitudinal axis. In some such examples, the snoot conveying surface extends widthwise and parallel relative to a snoot lateral axis that is perpendicular to the snoot longitudinal axis. In some such examples, the snoot longitudinal axis and the snoot lateral axis define a snoot normal axis that is perpendicular relative to the snoot longitudinal axis and the snoot lateral axis. In some such examples, a distal conveyor has a distal conveying surface facing upward and running lengthwise along a distal longitudinal axis. In some such examples, the distal conveying surface extends widthwise and parallel relative to a distal lateral axis that is perpendicular to the distal longitudinal axis. In some such examples, the distal longitudinal axis and the distal lateral axis define a distal normal axis that is perpendicular relative to the distal longitudinal axis and the distal lateral axis. In some such examples, the snoot conveyor is interposed between the distal conveyor and the main conveyor. In some such examples, the distal conveyor relative to the snoot conveyor is pivotal about a first axis that is substantially parallel to the snoot lateral axis. In some such examples, a transition conveyor interposed between the main conveyor and the snoot conveyor. In some such examples, the transition conveyor includes a main section coupled to the main conveyor and a snoot section coupled to the snoot conveyor. In some such examples, the main section defines a main plane of conveyance. In some such examples, the snoot section defines a snoot plane of conveyance. In some such examples, the main plane of conveyance is in substantially fixed coplanar alignment with the snoot plane of conveyance. In some such examples, the snoot section relative to the main section is pivotal about a second axis that remains substantially parallel to at least one of the main normal axis or the snoot normal axis. In some such examples, both the main section and the snoot section are pivotal in unison about a third axis that remains substantially parallel to at least one of the main lateral axis or the snoot lateral axis. In some such examples, both the main plane of conveyance and the snoot plane of conveyance remain substantially fixed in coplanar alignment with at least one of the main conveying surface or the snoot conveying surface.

In some examples, the second axis is substantially perpendicular relative to the third axis.

In some examples, both the main plane of conveyance and the snoot plane of conveyance remain substantially fixed in coplanar alignment with the main conveying surface.

In some examples, both the main plane of conveyance and the snoot plane of conveyance remain substantially fixed in coplanar alignment with the snoot conveying surface.

In some examples, the transition conveyor defines a curved interface between the main section and the snoot section of the transition conveyor, the snoot section relative to the main section being movable in a substantially circular path along the curved interface.

In some examples, the transition conveyor defines a curved interface between the main section and the snoot section of the transition conveyor. In some such examples, the snoot section relative to the main section is movable in a substantially circular path along the curved interface.

In some such examples, the conveyor system further includes a brake mounted to at least one of the main section or the snoot section. In some such examples, the brake is selectively configured to selectively impede and permit relative movement between the main section and the snoot section at the curved interface.

In some examples, a plurality of main rollers is supported by the main section of the transition conveyor. In some such examples, the plurality of main rollers includes a main roller rotatable about a main roller axis. In some such examples, a plurality of snoot rollers is supported by the snoot section of the transition conveyor. In some such examples, the plurality of snoot rollers includes a snoot roller being rotatable about a snoot roller axis. In some such examples, the main roller axis relative to the snoot roller axis is to be at an angle greater than zero when the snoot lateral axis is substantially parallel relative to the main lateral axis.

In some examples, a plurality of main rollers is supported by the main section of the transition conveyor. In some such examples, the plurality of main rollers includes a main roller rotatable about a main roller axis.

In some such examples, a plurality of snoot rollers supported by the snoot section of the transition conveyor. In some such examples, the plurality of snoot rollers includes a snoot roller being rotatable about a snoot roller axis. In some such examples, the main roller axis is to pivot relative to the snoot roller axis upon the snoot section pivoting about the second axis while the main roller axis and the snoot roller axis remain in substantially coplanar alignment with each other.

In some examples, the main conveyor has a main adjustable length, the snoot conveyor has a snoot fixed length, and the distal conveyor has a distal adjustable length. In some such examples, the main adjustable length is longer than the distal adjustable length, the main adjustable length is longer than the snoot fixed length, and the distal adjustable length is shorter than the snoot fixed length.

In some examples, a first side guide is proximate the main plane of conveyance of the transition conveyor and protruding upward. In some such examples, the first side guide has a first adjustable length extending between the main conveyor and the snoot conveyor. In some such examples, a second side guide is proximate the main plane of conveyance of the transition conveyor and protruding upward. In some such examples, the second side guide has a second adjustable length extending between the main conveyor and the snoot conveyor. In some such examples, the second side guide is spaced apart from the first side guide to delineate a passageway leading from the main conveyor to the snoot conveyor. In some such examples, the transition conveyor extending underneath the passageway. In some such examples, the first adjustable length automatically lengthens and the second adjustable length automatically shortens in reaction to the snoot section pivoting relative to the main section about the second axis.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A conveyor system comprising:
a first section;
a second section coupled to the first section to create a transition conveyor including the first section and the second section, the first section and the second section defining a plane of conveyance, the transition conveyor defining a first pivotal axis that is substantially parallel to the plane of conveyance;
a first conveyor running lengthwise along a first longitudinal axis, the first conveyor having a first conveying surface facing upward, the first conveyor relative to the transition conveyor being pivotal about the first pivotal axis, the second section relative to the first section being pivotal about a second pivotal axis that is substantially perpendicular to the first pivotal axis;
a curved interface between the first section and the second section of the transition conveyor, the second section relative to the first section being movable in a substantially circular path along the curved interface; and
a brake mounted to at least one of the first section or the second section, the brake being selectively configured to selectively impede or permit relative movement between the first section and the second section at the curved interface.

2. The conveyor system of claim 1, further comprising a second conveyor having a second conveying surface facing upward, the transition conveyor to couple the first conveyor and the second conveyor, the first conveyor relative to the second conveyor being pivotal about the first pivotal axis.

3. The conveyor system of claim 1, further comprising a second conveyor having a second conveying surface facing upward, the transition conveyor to couple the first conveyor and the second conveyor, the first conveyor relative to the second conveyor being pivotal about the first pivotal axis, the plane of conveyance being in substantially fixed coplanar alignment with the second conveying surface.

4. A conveyor system comprising:
a first section;
a second section coupled to the first section to create a transition conveyor including the first section and the second section, the first section and the second section defining a plane of conveyance, the transition conveyor defining a first pivotal axis that is substantially parallel to the plane of conveyance;
a first plurality of rollers on the first section of the transition conveyor, the first plurality of rollers including a first roller being rotatable about a first roller axis;
a second plurality of rollers on the second section of the transition conveyor, the second plurality of rollers including a second roller being rotatable about a second roller axis, the first roller axis to pivot relative to the second roller axis when the first conveyor pivots about the second pivotal axis while the first roller axis and the second roller axis remain in substantially coplanar alignment with each other;
a first conveyor running lengthwise along a first longitudinal axis, the first conveyor having a first conveying surface facing upward, the first conveyor relative to the transition conveyor being pivotal about the first pivotal axis, the second section relative to the first section being pivotal about a second pivotal axis that is substantially perpendicular to the first pivotal axis; and
a curved interface between the first section and the second section of the transition conveyor, the second section relative to the first section being movable in a substantially circular path along the curved interface.

5. A conveyor system comprising:
a first section;
a second section coupled to the first section to create a transition conveyor including the first section and the second section, the first section and the second section defining a plane of conveyance, the transition conveyor defining a first pivotal axis that is substantially parallel to the plane of conveyance;
a first conveyor running lengthwise along a first longitudinal axis, the first conveyor having a first conveying surface facing upward, the first conveyor relative to the transition conveyor being pivotal about the first pivotal axis, the second section relative to the first section being pivotal about a second pivotal axis that is substantially perpendicular to the first pivotal axis, the first conveyor extending lengthwise along the first longitudinal axis of the first conveyor;
a curved interface between the first section and the second section of the transition conveyor, the second section relative to the first section being movable in a substantially circular path along the curved interface;
a second conveyor extending lengthwise along a second longitudinal axis of the second conveyor, the second conveyor having a second conveying surface facing upward, the transition conveyor to couple the first conveyor and the second conveyor, the first conveyor relative to the second conveyor being pivotal about the first pivotal axis;
a first side guide extending upward and higher than the plane of conveyance of the transition conveyor, the first side guide having a first adjustable length extending substantially parallel to the plane of conveyance; and
a second side guide extending upward and higher than the plane of conveyance, the second side guide having a second adjustable length extending substantially parallel to the plane of conveyance, the second side guide being spaced apart from the first side guide to border a passageway extending between the first conveyor and the second conveyor, the transition conveyor extending underneath the passageway, the first adjustable length automatically lengthening and the second adjustable length automatically shortening in reaction to the second conveyor pivoting relative to the first conveyor about the second axis.

6. The conveyor system of claim 5, wherein the first side guide comprises a first plurality of side guide segments, the second side guide comprises a second plurality of side guide segments, the first plurality of side guide segments undergo relative translation in reaction to the second conveyor pivoting relative to the first conveyor about the second axis, and the second plurality of side guide segments undergo relative translation in reaction to the second conveyor pivoting relative to the first conveyor about the second axis.

7. The conveyor system of claim 5, wherein the first side guide is to pivot relative to the first conveyor and the second conveyor in reaction to the second conveyor pivoting relative to the first conveyor about the second axis, and the second side guide is to pivot relative to the first conveyor and the second conveyor in reaction to the second conveyor pivoting relative to the first conveyor about the second axis.

8. A conveyor system comprising:
a first conveyor having a first conveying surface facing upward and running lengthwise along a first longitudinal axis;
a second conveyor having a second conveying surface facing upward and running lengthwise along a second longitudinal axis, the second conveyor being spaced apart from the first conveyor to define a span between the first conveyor and the second conveyor, the second conveyor being pivotal relative to the first conveyor;
a first side guide protruding upward and extending lengthwise between the first conveyor and the second conveyor proximate the span, the first side guide having a first adjustable length; and
a second side guide protruding upward and extending lengthwise between the first conveyor and the second conveyor proximate the span, the second side guide having a second adjustable length, the first side guide being spaced apart from the second side guide to define a passageway between the first conveyor and the second conveyor, the first adjustable length automatically lengthening and the second adjustable length automatically shortening in reaction to the second conveyor pivoting relative to the first conveyor.

9. The conveyor system of claim 8, wherein the first side guide comprises a first plurality of side guide segments, the second side guide comprises a second plurality of side guide segments, the first plurality of side guide segments undergo relative translation in reaction to the second conveyor pivoting relative to the first conveyor, and the second plurality of side guide segments undergo relative translation in reaction to the second conveyor pivoting relative to the first conveyor.

10. The conveyor system of claim 8, wherein the first side guide is to pivot relative to both the first conveyor and the second conveyor in reaction to the second conveyor pivoting relative to the first conveyor, and the second side guide is to pivot relative to both the first conveyor and the second conveyor in reaction to the second conveyor pivoting relative to the first conveyor.

11. A conveyor system comprising:
a main conveyor having a main conveying surface facing upward and running lengthwise along a main longitudinal axis, the main conveying surface extending widthwise and parallel relative to a main lateral axis that is perpendicular to the main longitudinal axis, the main longitudinal axis and the main lateral axis defining a main normal axis that is perpendicular relative to the main longitudinal axis and the main lateral axis;
a snoot conveyor having a snoot conveying surface facing upward and running lengthwise along a snoot longitudinal axis, the snoot conveying surface extending widthwise and parallel relative to a snoot lateral axis that is perpendicular to the snoot longitudinal axis, the snoot longitudinal axis and the snoot lateral axis defining a snoot normal axis that is perpendicular relative to the snoot longitudinal axis and the snoot lateral axis;
a distal conveyor having a distal conveying surface facing upward and running lengthwise along a distal longitudinal axis, the distal conveying surface extending widthwise and parallel relative to a distal lateral axis that is perpendicular to the distal longitudinal axis, the distal longitudinal axis and the distal lateral axis defining a distal normal axis that is perpendicular relative to the distal longitudinal axis and the distal lateral axis, the snoot conveyor being interposed between the distal conveyor and the main conveyor, the distal conveyor relative to the snoot conveyor being pivotal about a first axis that is substantially parallel to the snoot lateral axis; and
a transition conveyor interposed between the main conveyor and the snoot conveyor, the transition conveyor comprising a main section coupled to the main conveyor and a snoot section coupled to the snoot conveyor, the main section defining a main plane of conveyance, the snoot section defining a snoot plane of conveyance, the main plane of conveyance being in substantially fixed coplanar alignment with the snoot plane of conveyance, the snoot section relative to the main section being pivotal about a second axis that remains substantially parallel to at least one of the main normal axis or the snoot normal axis, both the main section and the snoot section being pivotal in unison about a third axis that remains substantially parallel to at least one of the main lateral axis or the snoot lateral axis, and both the main plane of conveyance and the snoot plane of conveyance remaining substantially fixed in coplanar alignment with at least one of the main conveying surface or the snoot conveying surface.

12. The conveyor system of claim 11, wherein the second axis is substantially perpendicular relative to the third axis.

13. The conveyor system of claim 11, wherein both the main plane of conveyance and the snoot plane of conveyance remain substantially fixed in coplanar alignment with the main conveying surface.

14. The conveyor system of claim 11, wherein both the main plane of conveyance and the snoot plane of conveyance remain substantially fixed in coplanar alignment with the snoot conveying surface.

15. The conveyor system of claim 11, wherein the transition conveyor defines a curved interface between the main section and the snoot section of the transition conveyor, the snoot section relative to the main section being movable in a substantially circular path along the curved interface.

16. The conveyor system of claim 11, wherein the transition conveyor defines a curved interface between the main section and the snoot section of the transition conveyor, the snoot section relative to the main section being movable in a substantially circular path along the curved interface, and the conveyor system further comprising a brake mounted to at least one of the main section or the snoot section, the brake being selectively configured to selectively impede and permit relative movement between the main section and the snoot section at the curved interface.

17. The conveyor system of claim 11, further comprising:
a plurality of main rollers on the main section of the transition conveyor, the plurality of main rollers including a main roller being rotatable about a main roller axis; and
a plurality of snoot rollers on the snoot section of the transition conveyor, the plurality of snoot rollers including a snoot roller being rotatable about a snoot roller axis, the main roller axis relative to the snoot roller axis lying at an angle greater than zero when the snoot lateral axis is substantially parallel relative to the main lateral axis.

18. The conveyor system of claim 11, further comprising:
a plurality of main rollers on the main section of the transition conveyor, the plurality of main rollers including a main roller being rotatable about a main roller axis; and
a plurality of snoot rollers on the snoot section of the transition conveyor, the plurality of snoot rollers including a snoot roller being rotatable about a snoot roller axis, the main roller axis to pivot relative to the snoot roller axis upon the snoot section pivoting about the second axis while the main roller axis and the snoot roller axis remain in substantially coplanar alignment with each other.

19. The conveyor system of claim 11, wherein the main conveyor has a main adjustable length, the snoot conveyor has a snoot fixed length, and the distal conveyor has a distal adjustable length, the main adjustable length being longer than the distal adjustable length, the main adjustable length being longer than the snoot fixed length, and the distal adjustable length being shorter than the snoot fixed length.

20. The conveyor system of claim 11, further comprising:
a first side guide proximate the main plane of conveyance of the transition conveyor and protruding upward, the first side guide having a first adjustable length extending between the main conveyor and the snoot conveyor; and
a second side guide proximate the main plane of conveyance of the transition conveyor and protruding upward, the second side guide having a second adjustable length extending between the main conveyor and the snoot conveyor, the second side guide being spaced apart from the first side guide to delineate a passageway leading from the main conveyor to the snoot conveyor, the transition conveyor extending underneath the passageway, the first adjustable length automatically lengthening and the second adjustable length automatically shortening in reaction to the snoot section pivoting relative to the main section about the second axis.

* * * * *